US005119903A

United States Patent [19]

Ulshafer, Jr.

[11] Patent Number: 5,119,903

[45] Date of Patent: Jun. 9, 1992

[54] COLLAPSIBLE SAWHORSE APPARATUS

[76] Inventor: Carl Ulshafer, Jr., 501A W. 7th St., Ida Grove, Iowa 51445

[21] Appl. No.: 698,805

[22] Filed: May 13, 1991

[51] Int. Cl.[5] ........................ B27B 21/00; F16M 11/00

[52] U.S. Cl. .................................... 182/155; 182/225; 182/181; 248/439

[58] Field of Search ............... 182/155, 153, 151, 182, 182/225, 181; 248/439; 108/115, 132, 133

[56] References Cited

U.S. PATENT DOCUMENTS

| | | | |
|---|---|---|---|
| 1,778,566 | 10/1930 | Pitner | 182/155 |
| 2,216,187 | 10/1940 | Dion | 182/155 |
| 2,473,342 | 6/1949 | Larson | 182/155 |
| 3,198,286 | 8/1965 | Wilson | 182/155 |
| 3,445,312 | 5/1969 | Jones . | |
| 3,951,233 | 4/1976 | Meyers | 182/155 |
| 4,030,565 | 6/1977 | Chaput . | |
| 4,605,099 | 8/1986 | Crum et al. | 182/225 X |
| 4,640,386 | 2/1987 | Hall . | |
| 4,645,162 | 2/1987 | Roy et al. | 182/155 X |
| 4,756,385 | 7/1988 | Deitz et al. . | |
| 4,757,877 | 7/1988 | Twigger . | |
| 4,967,877 | 11/1990 | Wallman et al. | 182/225 X |

FOREIGN PATENT DOCUMENTS

| | | | |
|---|---|---|---|
| 647823 | 9/1962 | Canada | 182/155 |
| 943464 | 12/1963 | United Kingdom | 182/155 |

*Primary Examiner*—Karen J. Chotkowski

*Attorney, Agent, or Firm*—Henderson & Sturm

[57] ABSTRACT

A collapsible sawhorse assembly including a cross member having first and second ends, opposing side surfaces, a lower surface and an upper surface for supporting articles. A first and second pair of support legs are adapted to horizontally elevate the first and second ends of the cross member. The support legs each further include attachment ends and ground engagement ends. Means are provided for pivotally securing the attachment ends of the first and second pair of support legs in a generally side-by-side spaced apart relation adjacent the first and second ends, respectively, of the cross member so that the first and second pair of support legs may be moved from an upstanding cross member support position. The legs are generally perpendicular to the cross member while in an erect position, and are generally parallel to the cross member while in a collapsed storage position. Means are also provided for securing the first and second pair of support legs in a stored parallel position, such that the first pair of support legs are generally sandwiched between the second pair of support legs and the lower surface of the cross member such that a collapsed readily stored sawhorse is formed.

1 Claim, 2 Drawing Sheets

COLLAPSIBLE SAWHORSE APPARATUS

TECHNICAL FIELD

This invention relates to work support surfaces such as sawhorses and more particularly to foldable sawhorses capable of being transported from job sites.

BACKGROUND ART

In the art of supporting articles sawhorses are well known. For many years carpenters, plumbers, electricians, and other skilled tradesman have made sawhorses out of 2×4's and the like. Such sawhorses, although simple to build on a job site, are heavy, bulky, unwieldy, difficult to transport, difficult to store, and quickly wear out.

Known to the art are several types of advanced sawhorses. These sawhorses utilize the same general design of those sawhorses created on job sites, however, many improvements have been made over the years in the art. For example, Jones, U.S. Pat. No. 3,446,312, discloses a structural support having a pair of end stands which may be utilized to removably secure each end of a conventional 2×4. While the Jones device allows for replacement of a worn cross member 10, assembly and disassembly are complicated and labor intensive.

Another improved sawhorse is disclosed by Chaput, U.S. Pat. No. 4,030,565. Chaput teaches a transportable sawhorse package with a ridge board and two pairs of legs. While this device is an improvement over the prior art, in that it is somewhat more easily assembled and disassembled for transportation, it still requires assembly and disassembly of five separate components.

The art was advanced further by Hall, U.S. Pat. No. 4,640,386. Hall discloses a folding utility horse having a cross member having four legs pivotally attached thereto. However, this device still requires a user to unfasten each leg from the cross member, extend the leg into position, and secure each leg into its extended support position. This process must be reversed for storage and transportation. Additionally, while the Hall device is an improvement over the prior art it utilizes complex and expensive two axis leg joints. For this reason the purchase price of the Hall device simply exceeds the devices value for many tradesman.

Finally, Deitz, et al., U.S. Pat. No. 4,756,385 discloses a fold together saw bench. The device disclosed by Deitz utilizes a hinged cross member which allows the device to be folded substantially flat. However, although the device may be folded, it is not easily transported since its legs are always in an extended position.

Those concerned with these and other problems recognize the need for an improved "COLLAPSIBLE SAWHORSE APPARATUS."

DISCLOSURE OF THE INVENTION

The present invention provides a collapsible sawhorse assembly including a cross member having first and second ends, opposing side surfaces, a lower surface, and an upper surface for supporting articles. A first and second pair of support legs are adapted to horizontally elevate the first and second ends of the cross member. The support legs each further include attachment ends and ground engagement ends. Means are also provided for pivotally securing the attachment ends of the first and second pair of support legs in a generally side-by-side spaced apart relation adjacent to the first and second ends, respectively, of the cross member, so that the first and second pair of support legs may be moved from an upstanding cross member support position. The legs are generally perpendicular to the cross member while in an extended position and generally parallel to the cross member when in a collapsed storage position. Means are further provided for securing the first and second pair of support legs in a stored parallel position, such that the first pair of support legs are generally sandwiched between the second pair of support legs and the lower surface of the cross member such that a collapsed readily stored sawhorse is formed.

Therefore, it is a principle object of the present invention to provide an improved collapsible sawhorse apparatus.

A further object of the present invention is to provide a collapsible sawhorse assembly that is easy to assemble and easy to disassemble.

Yet another object of the present invention is to provide a collapsible sawhorse assembly that is convenient to store.

Still a further object of the present invention is to provide a collapsible sawhorse assembly that is inexpensive to manufacture.

Another object of the present invention is to provide a collapsible sawhorse assembly which provides a storage housing for the support legs.

Another object of the present invention is to provide a collapsible sawhorse assembly which does not require cross bracing.

Another object of the present invention is to provide a collapsible sawhorse assembly that is durable and stable in construction.

Another object of the present invention is to provide a collapsible sawhorse assembly that utilizes only two spring loaded locking pins to securely house its legs.

Another object of the present invention is to provide a collapsible sawhorse assembly which is efficient in operation and refined in appearance.

Another object of the present invention is to provide a collapsible sawhorse assembly which is easy to use, simple in construction, and trouble free.

Finally, another object of the present invention is to provide a foldable transportable sawhorse that is lightweight in construction.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BEST MODE FOR CARRYING OUT THE INVENTION

Figure 1:
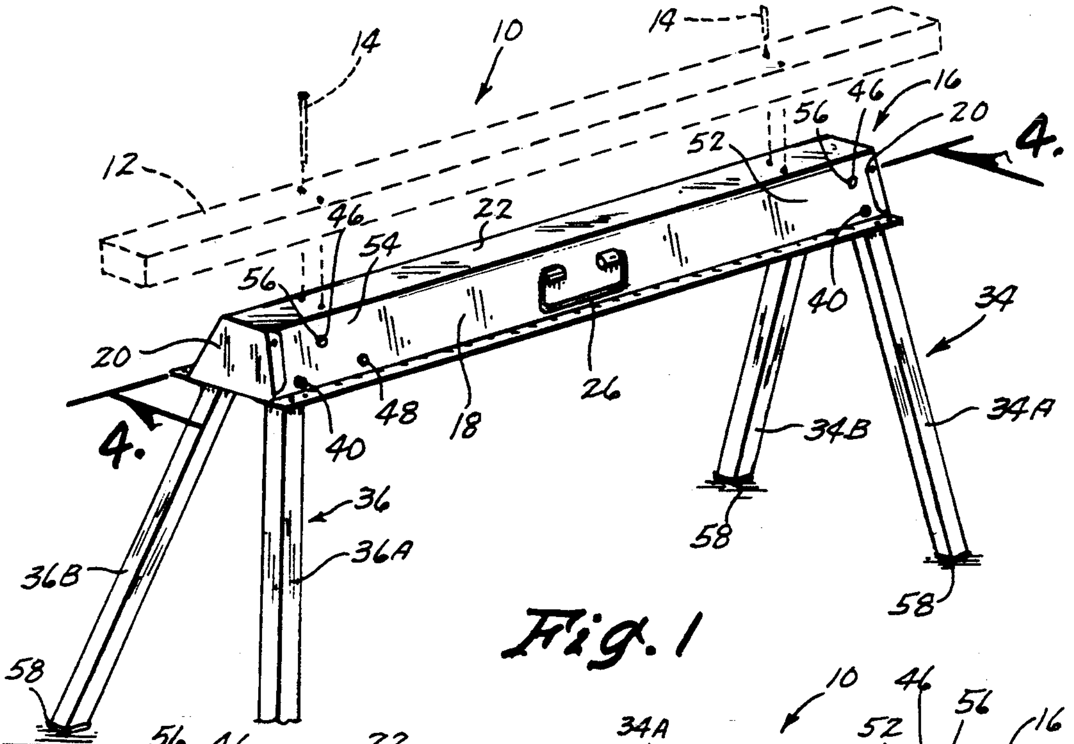
FIG. 1 is a perspective view of a preferred embodiment of the collapsible sawhorse apparatus showing the sawhorse in an erect ready to use position.

Referring now to the drawings, wherein like reference numerals designate identical or corresponding parts throughout the several views, FIG. 1 shows the apparatus 10 in an erect ready to use position.

In a preferred embodiment the apparatus includes a cross member assembly 16 which has a pair of opposing side walls 18, a pair of opposing end caps 20, and a support wall having upper 22 and lower 24 surfaces (FIG. 1). The Cross member assembly forms a cavity adapted to house both a first (34A, 34B) and second (36A, 36B) pair of support legs (FIG. 1, 2, 5, and 7).

The upper surface 22 of the cross member assembly is adapted to removably receive at least one wooden block 12 (FIG. 1). The wooden block 12 is provided in order to protect the cross member assembly 16 from damage caused by hand and power tools. The wooden block 12 may be fastened to the upper surface 22 via a plurality of screw type fasteners 14 (FIG. 1).

Figure 6:
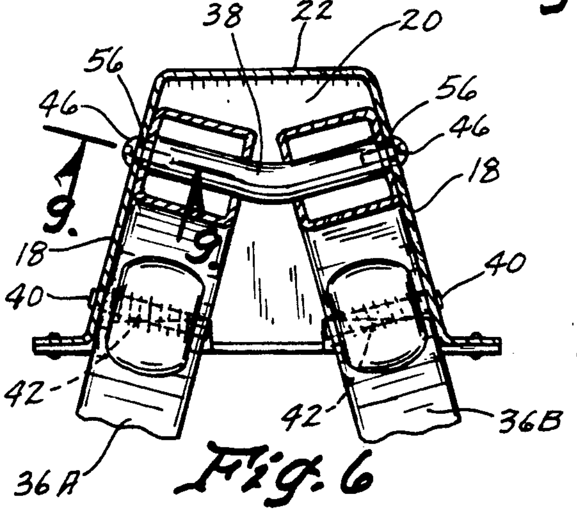
FIG. 6 is a cross-sectional end view of a preferred embodiment of the collapsible sawhorse apparatus, taken at lines 6—6 of FIG. 4, illustrating a leg pivot joint and locking pin securement means while the legs are in a collapsed stored position.

Adjacent the first end 52 of the cross member assembly 22 are two pair of spaced apart opposing holes formed through the opposing side walls 18 of assembly 16. The upper set of holes (pivot pin holes 56) are adapted to receive one end of a generally V-shaped pivot pin 38 (FIG. 6). The lower set of holes (set-up securement locking pin engagement holes 50 (FIG. 3), are adapted to removably receive the end of a locking pin 40 when the first pair of support legs (34A, 34B) are swung into a position generally perpendicular to the cross member assembly 16.

Adjacent the second end 54 (FIG. 1) of the cross member assembly 22 are three pair of spaced apart opposing holes formed through the opposing side walls 18 of assembly 16. The upper set of holes (pivot pin holes 56) are adapted to receive one end of a generally V-shaped pivot pin 38. The lower set of holes (set-up securement locking pin engagement holes 50), are adapted to removably receive the end of a locking pin 40 when the second pair of support legs (36A, 36B) are swung into a position generally perpendicular to the cross member assembly 16 (FIG. 1). The forward holes (storage securement locking pin engagement holes 48) are adapted to removably receive the end of the locking pin 40 when the second pair of support legs (36A, 36B) are swung into a position generally parallel to the cross member assembly 16 (FIG. 1).

Figure 7:
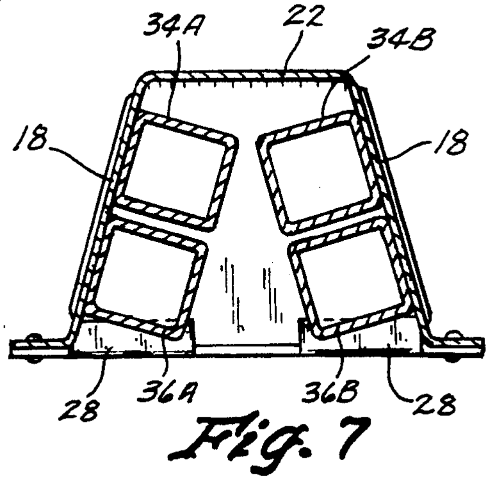
FIG. 7 is a cross-sectional center view of a preferred embodiment of the collapsible sawhorse apparatus, lines 7—7 of FIG. 5, illustrating the stored of the first and second pairs of support legs.

In a preferred embodiment, the second pair of support legs (36A, 36B), are slightly bent adjacent each attachment end (FIG. 4), said bend substantially within the plane of each leg (see FIG. 6), so that first pair of support legs (34A, 34B) may be retained in a stored position (FIG. 2 and 5) between the second pair of support legs (36A, 36B) and lower surface 24 of the cross member assembly 16 (FIG. 7).

Figure 3:
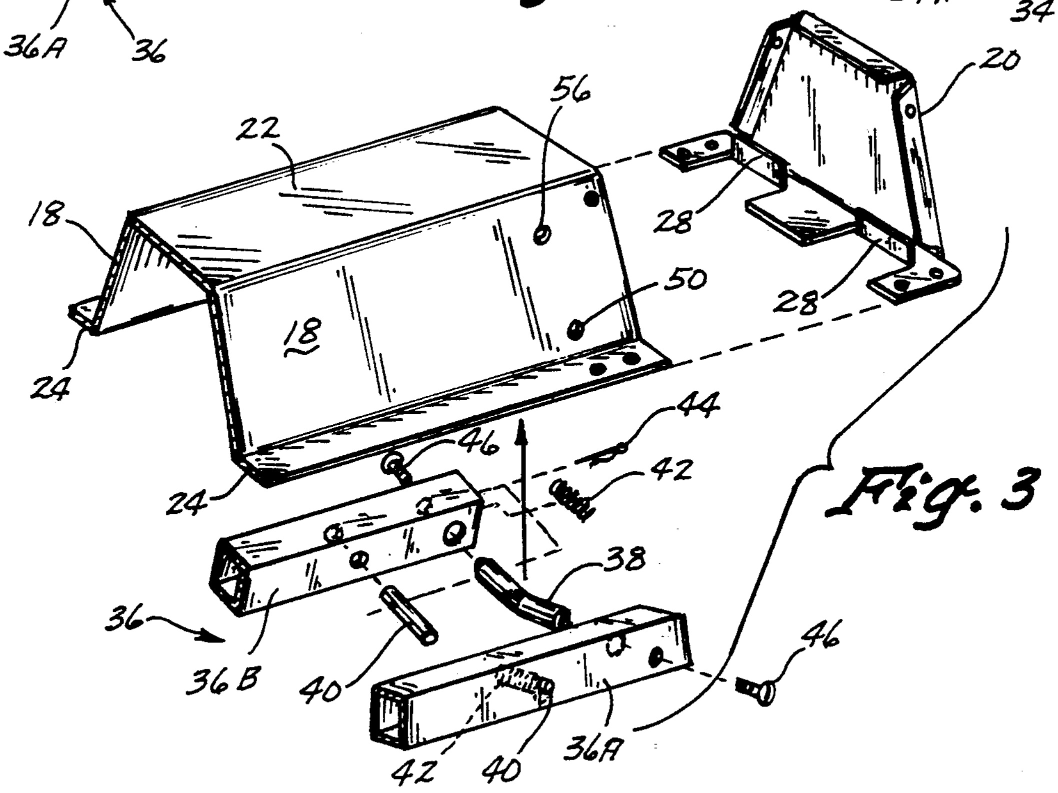
FIG. 3 is a perspective enlarged exploded view of the end portion of the cross member of a preferred embodiment of the collapsible sawhorse apparatus showing a preferred support leg pivot joint and leg securement means.
Figure 4:
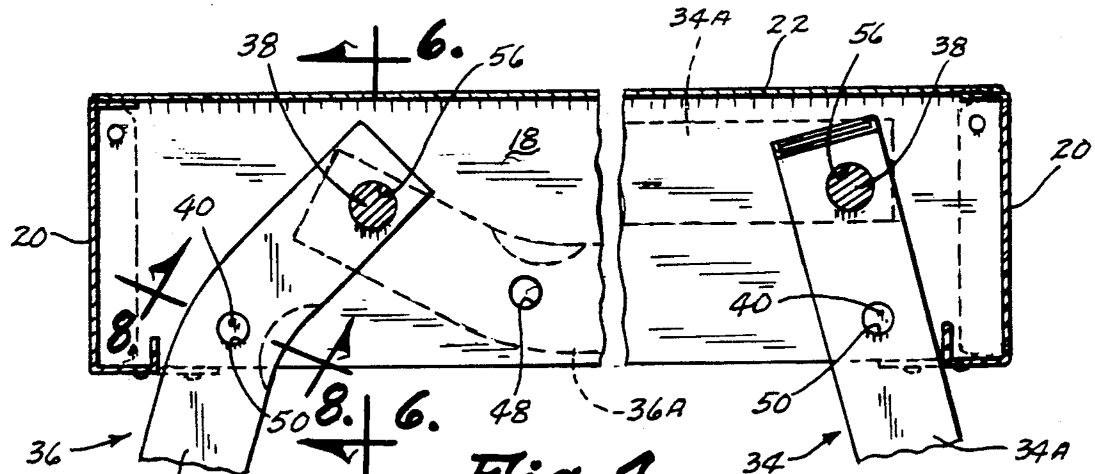
FIG. 4 is a cross-section, partially broken away elevation of each end of the cross member of a preferred embodiment of the collapsible sawhorse apparatus, taken at lines 4—4 of FIG. 1, illustrating the attachment ends of the first and second pair of support legs.

As is best illustrated by FIGS. 3, 4, and 6 a pair of leg channels 28 (FIG. 3) are preferably formed in the lower inwardly extended flange 30 of each opposing end Cap 20 of the cross member assembly 16 to frictionally and removably receive and secure both first (34A, 34B) and second (36A, 36B) pairs of support legs while the apparatus 10 is in an erect configuration (FIG. 1).

Figure 2:
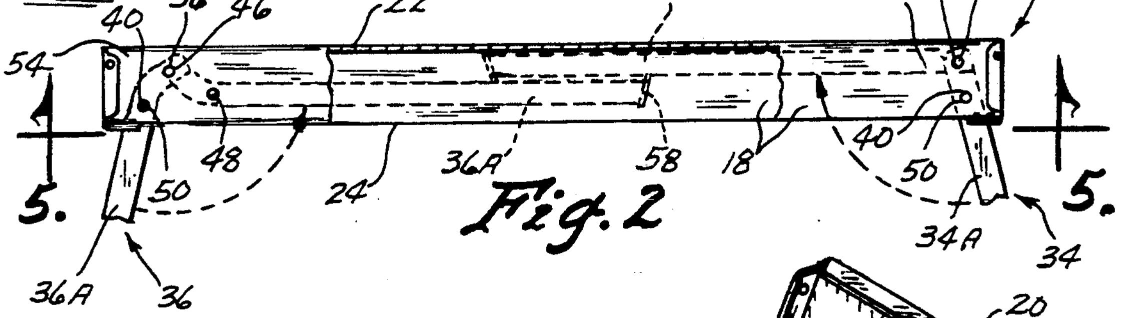
FIG. 2 is cross-section, partially broken-away elevation of the cross member assembly of a preferred embodiment of the collapsible sawhorse apparatus showing the manner of engagement and disengagement of the support legs and the first and second pairs of support legs in their stored position within the housing.
Figure 5:
FIG. 5 is a bottom plan view of a preferred embodiment of the collapsible sawhorse apparatus, taken at lines 5—5 of FIG. 2, illustrating the position of the first and second pairs of support legs in a collapsed stored position.

In preferred embodiments, the legs may be provided from $1\frac{1}{4}\times1\frac{1}{4}$ inch aluminum alloy tubing. Such tubing may be formed in 24, 30, and 36 inch interchangeable leg lengths so that the extended height of the cross member assembly may be adjusted. It will be apparent to those skilled in the art, however, that telescopically length adjustable legs might also be provided, and that such legs would be within the scope of the appended claims. Likewise, the ground engagement ends of the legs are preferably cambered and capped at 55 for increased stability (FIG. 2 and 5).

So that the legs have a wide, stable, transverse stance, the opposing side walls 18 are preferably formed or mounted so as to run 15° left and right from vertical (FIG. 6 and 7). The Cross member assembly 16 may be formed from any lightweight, durable material such as aluminum or steel.

Figure 8:
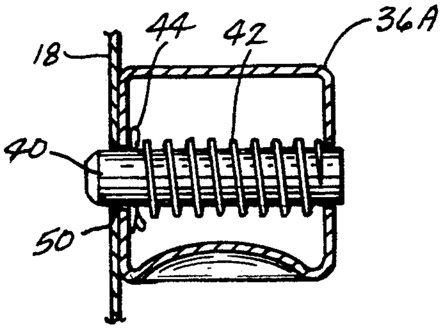
FIG. 8 is a cross-sectional side view of a preferred embodiment of one of the spring loaded locking pins of the collapsible sawhorse apparatus taken at lines 8—8 of FIG. 4.

The operation of the pivot pins 38 and lock pins 40 is best illustrated in FIGS. 3, and 6. FIG. 8 clearly illustrates the locking pin arrangement showing the pin 40, pin spring 42, and spring retainer key 44.

Figure 9:
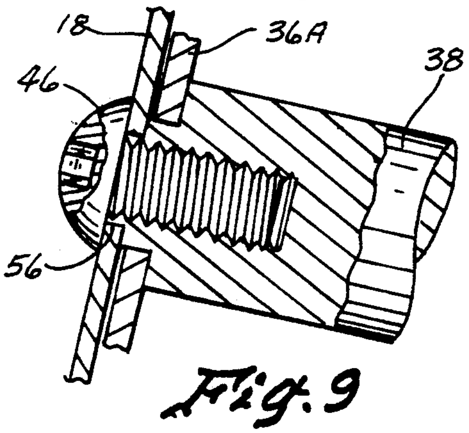
FIG. 9 is a cross-sectional side view of a preferred embodiment of one of the pivot pin end securement means taken at lines 9—9 of FIG. 6.

As best illustrated in FIG. 9 the pivot pin 38 is retained between opposing side walls 18, of the cross member assembly 16, via a pivot pin fastening screw 46 threaded into each end of the pin 38.

In operation, it will be apparent to those skilled in the art, t hat the apparatus 10 may be quickly and easily erected or collapsed by engaging or disengaging the locking pins 4o from their respective securement holes along the surface of the opposing side walls 18. In the erected position, the respective support legs 34A, 34B and 36A, 36B each have their locking pins 40 extended into and through their engagement holes 50; whereas, in the collapsed position the upper legs 34A, 34B, collapsed first, are held in place by the lower legs 36A, 36B due to the locking pins 40 having been released from holes 50 and re-inserted into and extended through the storage engagement holes 48.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A collapsible sawhorse assembly, comprising:

a cross member having first and second ends, opposing side surfaces, a lower surface, and an upper surface adapted to support articles, a first pair of support legs adapted to horizontally elevate said first end of said cross member, said first pair of support legs having an attachment end and a ground engagement end;

a second pair of support legs adapted to horizontally elevate said second end of said cross member, said second pair of support legs having an attachment end and a ground engagement end;

means for pivotally securing said attachment end of said first pair of support legs, in a generally side-by-side spaced apart relation, adjacent said first end of said cross member such that said first pair of support legs may be moved from a generally upstanding cross member support position, wherein said legs are generally perpendicular to said cross member, to a collapsed storage position wherein said legs are generally parallel to said cross member;

means for pivotally securing said attachment end of said second pair of support legs, in a generally side-by-side spaced apart relation, adjacent said second end of said cross member such that said second pair of support legs may be moved from a generally upstanding cross member support position, wherein said legs are generally perpendicular to said cross member, to a collapsed storage position wherein said legs are generally parallel to said cross member; and means for securing said first and second pair of support legs in a stored parallel position such that said first pair of support legs is generally sandwiched between said second pair of support legs and said lower surface of said cross member such that a collapsed readily stored sawhorse assembly is formed;

and further wherein each end wall of said cross member includes an inwardly extending flange formed along the base of said end, and with a pair of transversely spaced channels formed in said flange, each channel of a size to frictionally receive a support leg therein while in an extended non-collapsed position.

* * * * *